US012645329B2

(12) United States Patent
Cheng

(10) Patent No.: US 12,645,329 B2
(45) Date of Patent: *Jun. 2, 2026

(54) TIMING CONTROL CIRCUIT AND TIMING CONTROL METHOD THEREOF

(71) Applicant: NOVATEK Microelectronics Corp.,
Hsin-Chu (TW)

(72) Inventor: Huan-Teng Cheng, Hsinchu City (TW)

(73) Assignee: NOVATEK Microelectronics Corp.,
Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/185,275

(22) Filed: Apr. 22, 2025

(65) Prior Publication Data

US 2025/0244847 A1     Jul. 31, 2025

Related U.S. Application Data

(63) Continuation of application No. 17/881,584, filed on Aug. 4, 2022, now Pat. No. 12,379,808.
(Continued)

(30) Foreign Application Priority Data

May 5, 2022    (TW) .................................. 111116896

(51) Int. Cl.
*G06F 3/041* (2006.01)
*G09G 3/20* (2006.01)
(52) U.S. Cl.
CPC ....... *G06F 3/04184* (2019.05); *G09G 3/2092* (2013.01); *G09G 3/2096* (2013.01);
(Continued)

(58) Field of Classification Search
CPC .............. G06F 3/04184; G09G 3/2092; G09G 3/2096; G09G 2310/08; G09G 2320/0247;
(Continued)

(56) References Cited

U.S. PATENT DOCUMENTS 10,088,965 B2 * 10/2018 Karuppusamy ....... G06F 3/0445
2013/0050146 A1 2/2013 Saitoh
(Continued)

FOREIGN PATENT DOCUMENTS

CN     105390100 A     3/2016
CN     107015687 A     8/2017
(Continued)

OTHER PUBLICATIONS

Fang Yong et al., Design of Video Convert System in Autostereoscopic Display and Its Implementation with FPGA, Chinese Journal of Liquid Crystals and Displays, vol. 22, No. 1, Feb. 2007, pp. 94-98, Feb. 2007.

*Primary Examiner* — Michael A Faragalla
(74) *Attorney, Agent, or Firm* — Winston Hsu

(57) ABSTRACT

A timing control circuit includes a receiving circuit and a line memory. The line memory is configured for receiving a signal, outputting a first data signal corresponding to a first frame of the signal to drive at least one data line, and outputting a second data signal corresponding to a second frame of the signal. After a first frame rate of the first frame is determined to be higher than a second frame rate of the second frame, a switch from a long V mode to a long H mode takes place, such that the first data signal corresponds to the long V mode and the second data signal corresponds to the long H mode. After the first frame rate is determined to be lower than the second frame rate, a switch from the long H mode to the long V mode takes place.

20 Claims, 7 Drawing Sheets

Related U.S. Application Data

(60) Provisional application No. 63/238,788, filed on Aug. 31, 2021.

(52) U.S. Cl.
CPC . *G09G 2310/08* (2013.01); *G09G 2320/0247* (2013.01); *G09G 2330/021* (2013.01); *G09G 2340/0435* (2013.01); *G09G 2354/00* (2013.01); *G09G 2370/08* (2013.01)

(58) Field of Classification Search
CPC ..... G09G 2330/021; G09G 2340/0435; G09G 2354/00; G09G 2370/08
See application file for complete search history.

(56) References Cited

U.S. PATENT DOCUMENTS

| | | | |
|---|---|---|---|
| 2017/0153736 A1* | 6/2017 | Kim | G06F 3/0443 |
| 2020/0043432 A1 | 2/2020 | Choi | |
| 2020/0293143 A1 | 9/2020 | Cheng | |
| 2020/0357324 A1* | 11/2020 | Park | G09G 3/3266 |
| 2021/0089188 A1 | 3/2021 | Lin | |
| 2021/0191547 A1* | 6/2021 | Hsu | G06F 3/04184 |

FOREIGN PATENT DOCUMENTS

| | | |
|---|---|---|
| CN | 112530334 A | 3/2021 |
| CN | 112785980 A | 5/2021 |
| CN | 113299251 A | 8/2021 |
| TW | 201243821 A1 | 11/2012 |
| TW | 202036514 A | 10/2020 |
| TW | 202046281 A | 12/2020 |

* cited by examiner

TIMING CONTROL CIRCUIT AND TIMING CONTROL METHOD THEREOF

CROSS REFERENCE TO RELATED APPLICATIONS

This application is a continuation application of U.S. application Ser. No. 17/881,584, filed on Aug. 4, 2022, which claims the benefit of U.S. Provisional Application No. 63/238,788, filed on Aug. 31, 2021. The contents of these applications are incorporated herein by reference.

BACKGROUND OF THE INVENTION

1. Field of the Invention

The present invention relates to a timing control circuit and a timing control method thereof, and more particularly, to a timing control circuit and a timing control method which may improve display quality and reliability.

2. Description of the Prior Art

In a touch-and-display-driver integrated circuit (TDDI), display operation and touch operation are performed in a time-division manner to avoid noise interference that affects the touch operation or produces wrong display results. To improve display quality and reliability, there is still room for improvement when it comes to the operation of a TDDI.

SUMMARY OF THE INVENTION

It is therefore a primary objective of the present application to provide a timing control circuit and a timing control method thereof to improve display quality and reliability.

An embodiment of the present invention provides a timing control circuit comprising a receiving circuit; and a line memory, coupled to the receiving circuit, wherein the line memory is configured for: receiving a signal; outputting a first data signal corresponding to a first frame of the signal to drive at least one data line; and outputting a second data signal corresponding to a second frame of the signal to drive the at least one data line; wherein after a first frame rate of the first frame is determined to be higher than a second frame rate of the second frame, a switch from a long V mode to a long H mode takes place, such that the first data signal corresponds to the long V mode and the second data signal corresponds to the long H mode; wherein after the first frame rate is determined to be lower than the second frame rate, a switch from the long H mode to the long V mode takes place, such that the first data signal corresponds to the long H mode and the second data signal corresponds to the long V mode.

An embodiment of the present invention provides a timing control method comprising receiving a signal; outputting a first data signal corresponding to a first frame of the signal to drive at least one data line; and outputting a second data signal corresponding to a second frame of the signal to drive the at least one data line; wherein after a first frame rate of the first frame is determined to be higher than a second frame rate of the second frame, a switch from a long V mode to a long H mode takes place, such that the first data signal corresponds to the long V mode and the second data signal corresponds to the long H mode; and wherein after the first frame rate is determined to be lower than the second frame rate, a switch from the long H mode to the long V mode takes place, such that the first data signal corresponds to the long H mode and the second data signal corresponds to the long V mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
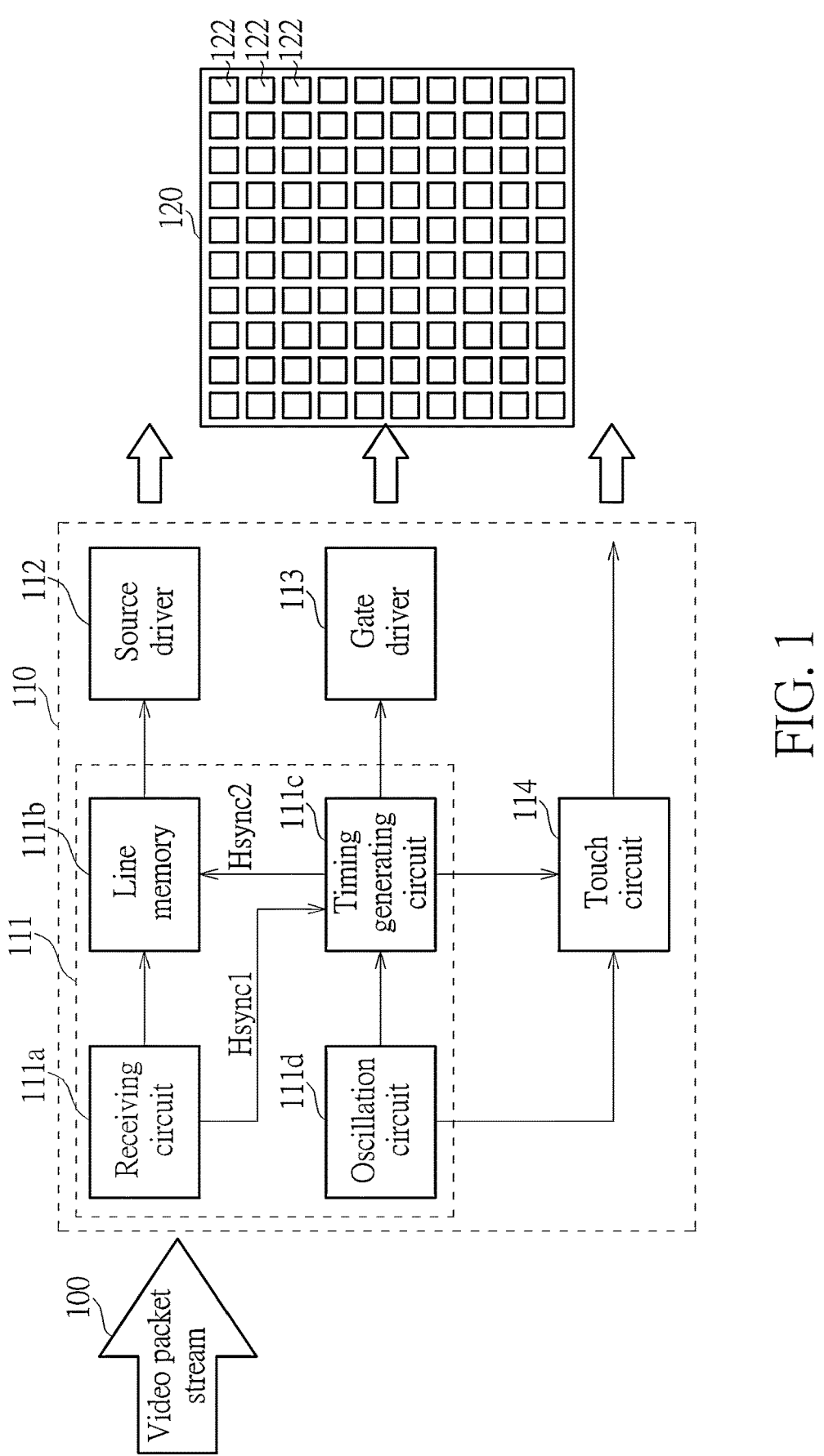
FIG. 1 is a schematic diagram of a touch display device according to an embodiment of the present invention.

FIG. 1 is a schematic diagram of a touch display device 10 according to an embodiment of the present invention. The touch display device 10 includes a driving circuit 110 and a touch display panel 120. The driving circuit 110 may receive a video packet stream 10 from a front stage circuit (which is not shown and is, for example, a processor, etc.) via a transmission interface. Different frames of the video packet stream 100 may correspond to horizontal periods (also referred to as 1H or line times) of different time lengths; accordingly, the driving circuit 110 may switch between a long H mode and a long V mode) to ensure display quality.

Specifically, the driving circuit 110 may include a timing control circuit 111, a source driver 112, a gate driver 113, and a touch circuit 114. The timing control circuit 111 may receive the video packet stream 100. The timing control circuit 111 may provide a vertical start signal or a gate clock signal to the gate driver 113 according to the video packet stream 100, such that the gate driver 113 may drive at least one gate line (not shown) of the touch display panel 120. The timing control circuit 111 may provide a vertical synchronization signal, a horizontal start signal, or data signal(s) to the source driver 112 according to the video packet stream 100, such that the source driver 112 may drive at least one data line (not shown) of the touch display panel 120. The timing control circuit 111 may control the touch circuit 114, such that the touch circuit 114 may provide a touch signal to drive at least one touch electrode 122 of the touch display panel 120.

Figure 2:
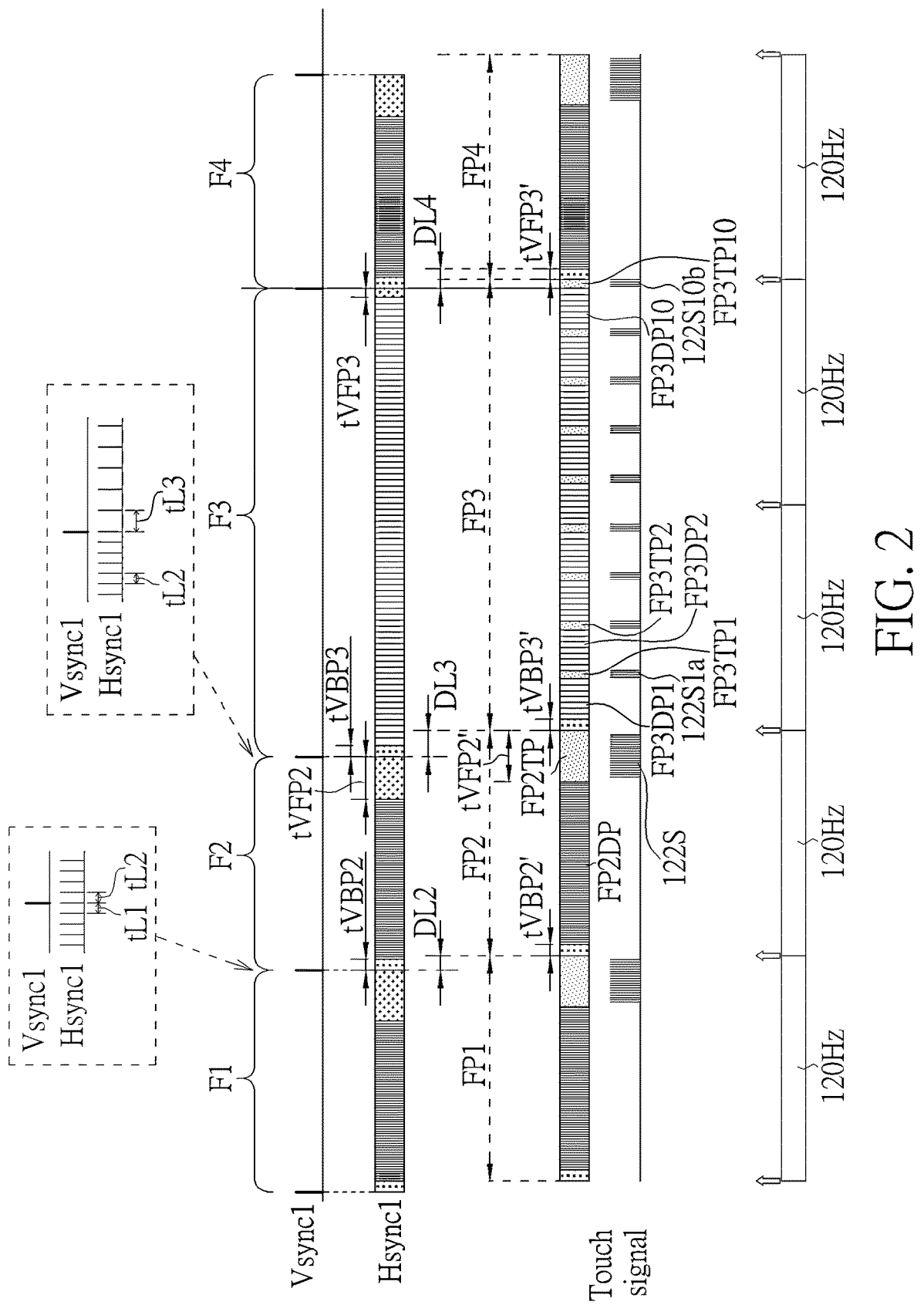
FIG. 2 is a schematic timing diagram according to an embodiment of the present invention.
Figure 3:
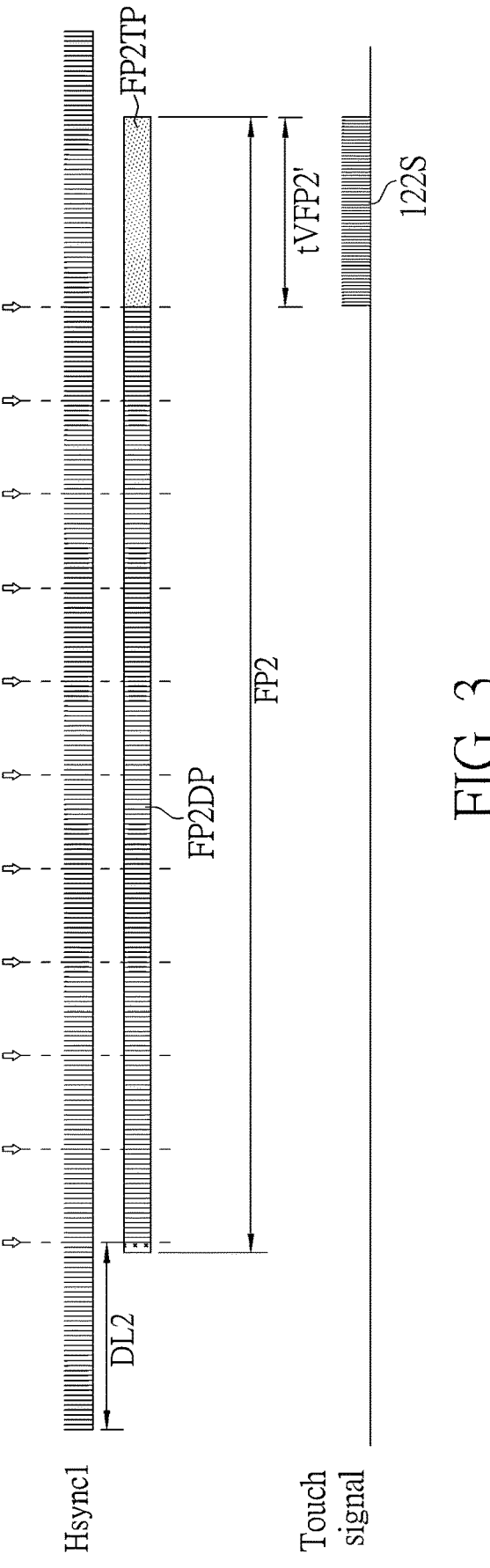
FIG. 3 and FIG. 4 are partial enlarged schematic diagrams of FIG. 2 respectively.
Figure 4:
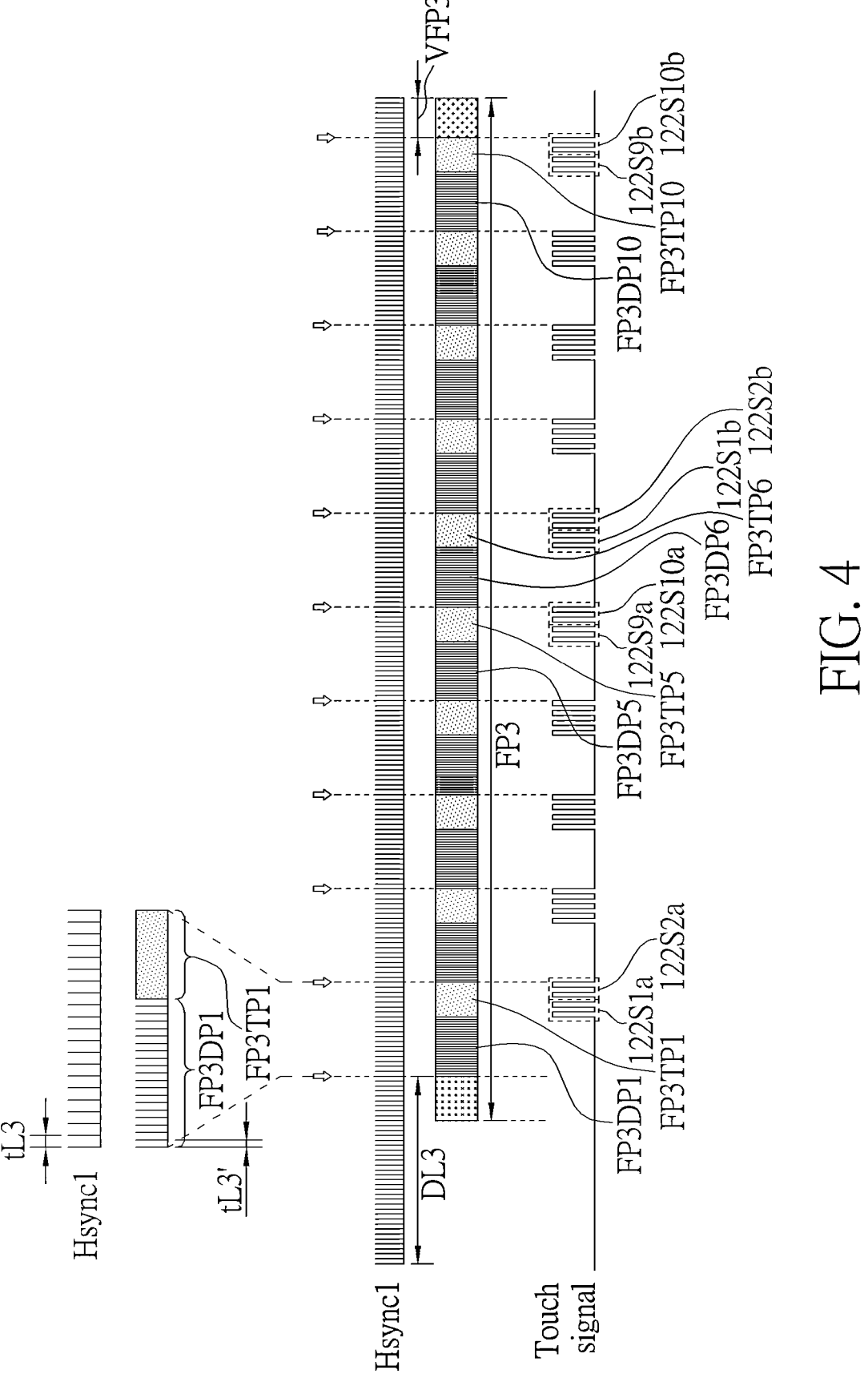

The timing control circuit 111 may include a receiving circuit 111a, a line memory 111b, a timing generating circuit 111c, and an oscillation circuit 111d. Please refer to FIG. 1~FIG. 4. FIG. 2 is a schematic timing diagram according to an embodiment of the present invention. FIG. 3 and FIG. 4 are partial enlarged schematic diagrams of FIG. 2 respectively.

The receiving circuit 111a may be configured to receive the video packet stream 100. In one embodiment, the receiving circuit 111a may decode the video packet stream 100 to generate an external vertical synchronization signal Vsync1, an external horizontal synchronization signal Hsync1, or an original data signal shown in FIG. 2. The external vertical synchronization signal Vsync1 may be configured to indicate the start or end of a frame. As shown in FIG. 2, the external horizontal synchronization signal Hsync1 may include a plurality of pulses (also referred to as lines) in one frame (e.g., one of frames F1 to F4). The period/cycle of one pulse is one horizontal period (e.g., one of horizontal periods tL1 to tL3). The horizontal period (e.g., the horizontal period tL2) of each/one pulse of one frame (e.g., the frame F2) is the same/equal, while the horizontal periods (e.g., the horizontal periods tL2 and tL3) of different frames (e.g., the frames F2 and F3) may be different/ unequal.

The oscillating circuit 111*d* may be configured to provide an internal clock signal to the timing generating circuit 111 *c* or the touch circuit 114.

The timing generation circuit 111*c* may be configured to receive the external horizontal synchronization signal Hsync1 from the receiving circuit 111*a*, and convert the external horizontal synchronization signal Hsync1 into an internal horizontal synchronization signal Hsync2 according to the internal clock signal from the oscillator circuit 111*d*. Besides, the timing generation circuit 111*c* may be configured to detect/measure the time length of one/each horizontal period (e.g., the horizontal period tL1/tL2/tL3) of the external horizontal synchronization signal Hsync1 to determine whether to switch to the long H mode or the long V mode.

In one embodiment, the line memory 111*b* may be configured to receive the external vertical synchronization signal Vsync1, the external horizontal synchronization signal Hsync1, or the original data signal from the receiving circuit 111*a* Pixel data (e.g., the original data signal) may be written into the line memory 111*b* according to the external horizontal synchronization signal Hsync1. The line memory 111*b* may be configured to receive the internal horizontal synchronization signal Hsync2 from the timing generation circuit 111*c*, and may provide the pixel data (e.g., a first data signal outputted during a frame period FP2 or a second data signal outputted during a frame period FP3) to the source driver 112 according to the internal horizontal synchronization signal Hsync2. The first data signal and the second data signal may correspond to different modes: For example, the first data signal may correspond to the long V mode; the second data signal may correspond to the long H mode.

In short, the timing generation circuit 111*c* may be configured to determine whether the time lengths of horizontal periods (e.g., the horizontal periods tL1-tL2 or tL2-tL3) of two consecutive/adjacent frames of the external horizontal synchronization signal Hsync1 are the same/equal. Because the time lengths of the horizontal periods tL2 and tL3 differ/unequal, the first data signal and the second data signal may correspond to different ones of the long H mode and the long V mode respectively. Because the time lengths of the horizontal periods tL2 and tL3 are equal/the same, data signal outputted during a frame period FP1 and the first data signal outputted during the frame period FP2 correspond to the same one of the long H mode and the long V mode.

For example, the receiving circuit 111*a* may receive a first external signal of the video packet stream 100 in the frame F2, extract/find the original data signal of the frame F2 and the horizontal period tL2 of the frame F2 of the external horizontal synchronization signal Hsync1 from the first external signal, and write the original data signal into the line memory 111*b* according to the external horizontal synchronization signal Hsync1. Accordingly, the line memory 111*b* may provide the first data signal to the source driver 112 during the frame period FP2 according to the internal horizontal synchronization signal Hsync2. The frame period FP2 corresponds to the frame F2 and has the same time length as the frame F2. Because the horizontal period tL2 is shorter, the first data signal may correspond to the long V mode. Because the horizontal period tL1 and the horizontal period tL2 are equal, both the data signal outputted during the frame period FP1 and the first data signal may correspond to the long V mode.

As shown in FIG. 2, in the long V mode, the frame period FP2 is divided into a display operation period FP2DP and a touch operation period FP2TP. The display operation period FP2DP is configured for outputting pixel data to the touch display panel 120. The display operation period FP2DP, which is continuous (without interruption), is configured for all display operations of one frame continuously. The touch operation period FP2TP is configured for transmitting a touch signal 122S. The scanning of (all) the touch electrodes 122 is continuously performed. The touch signal 122S shown in FIG. 3 is transmitted during the touch operation period FP2TP, which is continuous (without interruption). In the long V mode, touch operation may be performed after pixel data corresponding to all gate lines are outputted (i.e., touch operation will not be performed until all the display operation of a frame is completed). Display operation is performed continuously, which may avoid display stripe(s) in the long H mode and improve reliability (RA).

Similarly, the receiving circuit 111*a* may receive a second external signal of the video packet stream 100 in the frame F3, extract/find the original data signal of the frame F3 and the horizontal period tL3 of the frame F3 of the external horizontal synchronization signal Hsync1 from the second external signal, and write the original data signal into the line memory 111*b* according to the external horizontal synchronization signal Hsync1. Accordingly, the line memory 111*b* may provide the second data signal to the source driver 112 during the frame period FP3 according to the internal horizontal synchronization signal Hsync2. The frame period FP3 corresponds to the frame F3 and has the same time length as the frame F3. Because the horizontal period tL3 is longer (e.g., than the horizontal period tL2), the second data signal may correspond to the long H mode.

In the long H mode, the frame period FP3 is divided into a plurality of time units (e.g., 10 time units). Each time unit has a display operation sub-period and a touch operation sub-period. Display operation sub-periods FP3DP1 to FP3DP10 are configured to output pixel data to the touch display panel 120. Touch operation sub-periods FP3TP1 to FP3TP10 are configured to transmit touch signals. For example, touch signals 122S1*a* to 122S10*b* shown in FIG. 4 may be transmitted in the discontinuous touch operation sub-periods FP3TP1-FP3TP10 respectively. (There is a time interval between any two discontinuous touch operation sub-periods.) Only part of the touch electrodes 122 (e.g., one or several row(s)/column(s) of the touch electrodes 122) are driven during one touch operation sub-period because the time length of one touch operation sub-period may be limited. One touch operation sub-period may be inserted between two adjacent display operation sub-periods. That is, the display operation sub-periods FP3DP1-FP3DP10 and the touch operation sub-periods FP3TP1-FP3TP10 are interleaved in the long H mode. In the long H mode, display operation may be suspended/paused during a long H pause period (i.e., a touch operation sub-period) after a fixed number of gate lines is driven (or after pixel data corresponding to the gate lines is outputted) so as to perform/start/continue touch operation.

Pixel data written to the line memory 111*b* during one touch operation sub-period (e.g., the touch operation sub-period FP3TP1) may be read out from the line memory 111*b* in the next display operation sub-period (e.g., the display operation sub-period FP3DP2) corresponding/according to the internal horizontal synchronization signal Hsync2. In one embodiment, (the voltage(s) applied to) data line(s) during the touch operation sub-period FP3TP1-FP3TP10 may not equal to 0 volts. The data line(s) may have waveform(s) with the same voltage(s)/phase(s) as the touch signal(s) to reduce the loading of the touch signal(s) (i.e., load free driving (LFD)).

In the long H mode, some long H pause periods usually occur when the same gate line is driven, such that the driving (or turned-on) time of the gate line is much longer than the driving time(s) of other gate lines. Therefore, circuit element(s) (i.e., thin film transistor(s)) corresponding to the gate line may deteriorate more rapidly/seriously than circuit elements corresponding to other gate lines, resulting in different display performance of the gate lines. For example, there may be an irrecoverable display stripe (also referred to as a horizontal line, long H stripe, or horizontal gate line stripe) appearing on the touch display panel 120 due to long-term stress on the thin film transistors corresponding to the gate line. Switching between the long H mode and the long V mode may avoid the irrecoverable display stripe on the touch display panel 120.

High Frame Rate and Low Frame Rate

In one embodiment, it may adopt the long V mode at a high frame rate (HFR) and adopt the long H mode at a low frame rate (LFR). For example, the frame period FP2 may be, for example, 8.33 milliseconds (ms). A (display) frame rate (also referred to as a refresh rate) is the reciprocal of its frame period. The frame rate corresponding to the frame period FP2 may be, for example, 120 Hertz (Hz). The frame period FP3 may be, for example, 16.67 milliseconds; the frame rate may be, for example, 60 Hz. Because the frame period FP2 of the first data signal is smaller/shorter than the frame period FP3 of the second data signal (that is, the frame periods FP2 and FP3 correspond to an HFR and an LFR respectively), the first data signal corresponds to the long V mode and the second data signal corresponds to the long H mode. Using the long V mode at an HFR may avoid irrecoverable display stripes on the touch display panel 120 when the horizontal period tL2 is short.

In one embodiment, because the frame period FP2 of the first data signal is smaller/shorter than the frame period FP3 of the second data signal, the first data signal corresponds to the long V mode while the second data signal corresponds to the long H mode and an extended H mode. The number of pulses/lines (i.e., line counts) of the frame period FP3 corresponding to the extended H mode is unchanged (e.g., equal to the number of pulses of the frame period FP2). The horizontal period tL3 corresponding to the extended H mode is longer (e.g., than the horizontal period tL2), and the frame period FP3 corresponding to the extended H mode is longer (e.g., than the frame period FP2), such that the frame period FP3 corresponds to an LFR (which is, for example, lower than the frame rate corresponding to the frame period FP2). In the extended H mode, a vertical blank period, which is not configured for display operation and thus during which no display operation occurs, is less than one-half of the frame period FP3. A vertical blank period of one frame may include a vertical front porch (VFP) time, a vertical back porch (VBP) time, or a vertical synchronization time corresponding to the external vertical synchronization signal Vsync1. Because a VFP time tVFP3' of the frame period FP3 in the extended H mode may not be too long, flickering issues may be resolved. Besides, the horizontal period tL3 corresponding to the extended H mode is longer, so it is easier for voltage(s) to reach predetermined/desired level(s).

In another embodiment, the second data signal may correspond to an extend Vproch mode. In the extend Vproch mode, because a vertical blank period of a frame is longer, the non-driving (or turning-off) time of one/each gate line is longer. As a result, circuit element(s) (e.g., thin film transistor(s)) corresponding to one/each gate line are turned off for a longer time in the frame, such that electric potential(s) of the corresponding liquid crystal capacitor(s) drops/drop, which affects the corresponding grayscale value(s). In the next frame, the circuit elements corresponding to the gate line(s) are turned on again and the corresponding liquid crystal capacitors are charged to achieve the expected grayscale value(s). Flickering may thus occur on the touch display panel 120.

Touch Report Rate

In one embodiment, the frame period FP2 and the frame period FP3 are not equal, but the touch report rate (also referred to as a touch frame rate) corresponding to the frame period FP2 may be equal to the touch report rate corresponding to the frame period FP3. For example, the frame period FP2 and the frame period FP3 may be 8.33 ms and 16.67 ms respectively, such that the frame rates are 120 Hz and 60 Hz respectively while the corresponding touch point rates may be 120 Hz.

Specifically, in the long V mode, a touch report rate may be equal to its corresponding frame rate. Therefore, all display operation of one frame is performed in one frame period (e.g., the frame period FP2), and the entire touch display panel 120 is scanned (i.e., touch operation is performed) once in one frame. For example, (all) the touch electrodes 122 are driven using the touch signal 122S only during the touch operation period FP2TP.

In the long H mode, a touch report rate may be unequal to its corresponding frame rate: The touch report rate may be an integer multiple or a fractional multiple of the frame rate. Therefore, all display operation of one frame is performed in one frame period (e.g., the frame period FP3), while the entire touch display panel 120 is scanned for touch operation an integer number of times or a non-integer number of times in one frame. For example, the touch display panel 120 may include 10 columns (or 10 rows) of touch electrodes 122. The touch operation sub-periods FP3TP1-FP3TP5 may be used to perform the first scan of the touch electrodes 122 from the first column/row to the tenth column/row; the touch operation sub-periods FP3TP6-FP3TP10 may be used to perform the second scan of the touch electrodes 122 from the first column/row to the tenth column/row. For example, the touch signal 122S1*a* may be used to drive the touch electrodes 122 in the first column/row in the touch operation sub-period FP3TP1; the touch signal 122S1*b* may be used to drive the touch electrodes 122 in the first column/row in the touch operation sub-period FP3TP6. That is, the entire touch display panel 120 is scanned for touch operation twice in one frame. The long H mode may thus achieve a touch report rate different from its frame rate.

In either the long H mode or the long V mode, all the touch electrodes 122 may be sensed independently at least once per frame, and the coordinate of a touch may be reported to a host.

In short, by switching between the long H mode and the long V mode, the touch report rate corresponding to the frame period FP2 may be equal to the touch report rate corresponding to the frame period FP3 even if the frame period FP2 is not equal to the frame period FP3 (and the frame rate corresponding to the frame period FP2 is not equal to the frame rate corresponding to the frame period FP3).

In one embodiment, when switching from an HFR (e.g., 120 Hz) to an LFR (e.g., 40 Hz), the touch report rate may be maintained at 120 Hz but is not limited thereto. In another embodiment, when switching from an HFR (e.g., 120 Hz) to an LFR (e.g., 40 Hz), the touch report rate may be changed (e.g., from 120 Hz to 60 Hz) according to different design considerations.

Delay

In one embodiment, in the long V mode, pixel data may not be written into the line memory 111b. In another embodiment, the line memory 111b may be used for the switching between the long H mode and the long V mode: In the long H mode, pixel data may be written into the line memory 111b to squeeze out time for touch operation. Correspondingly, in the long V mode, pixel data may be written into the line memory 111b as well.

Specifically, please refer to FIG. 1 and FIG. 4. In the long H mode, the frequency of the internal horizontal synchronization signal Hsync2 may be higher than that of the external horizontal synchronization signal Hsync1. The receiving circuit 111a may write pixel data (e.g., the original data signal) into the line memory 111b according to the external horizontal synchronization signal Hsync1. Besides, the pixel data may be read out from the line memory 111b at a faster data rate according to the internal horizontal synchronization signal Hsync2 in the frame period FP3. The time for display operation may be compressed/shortened so as to squeeze out time for touch operation.

As shown in FIG. 4, the horizontal period tL3' corresponding to the display operation sub-period FP3DP1 is smaller/shorter than the horizontal period tL3 of the external horizontal synchronization signal Hsync1 to squeeze out the touch operation sub-period FP3TP1 for touch operation. The horizontal period tL3 of the external horizontal synchronization signal Hsync1 may correspond to the time to write pixel data corresponding to one gate line to the line memory 111b. The horizontal period tL3' may be the cycle time of applying voltage(s) to a row of pixels of the touch display panel 120 (e.g., the time length between the starting time to apply voltage(s) to one row of pixels and the starting time to apply voltage(s) to another row of pixels) or the cycle time of driving one gate line (e.g., the time length between the starting time to drive one gate line and the starting time to drive another gate line). The horizontal period tL3' may correspond to the time to read pixel data corresponding to one gate line from the line memory 111b.

For example, in the long H mode, the receiving circuit 111a may write the received pixel data corresponding to 20 gate lines into the line memory 111b according to the external horizontal synchronization signal Hsync1 within the time length of one time unit. The internal horizontal synchronization signal Hsync2 may be used to control the pixel data corresponding to the 20 gate lines to be read out from the line memory 111b at a faster data rate and transferred to the touch display panel 120 so as to perform display operation of the pixel data corresponding to the 20 gate lines in one display operation sub-period (e.g., the display operation sub-period FP3DP1). That is, the amount of pixel data received in one time unit is equal to the amount of pixel data outputted in one display operation sub-period of one time unit.

For example, in the long H mode, a certain amount of pixel data (e.g., pixel data corresponding to the gate lines from the first row to the 20th row) may be outputted to the touch display panel 120 corresponding/according to the internal horizontal synchronization signal Hsync2 in one display operation sub-period (e.g., the display operation sub-period FP3DP1). Then, a touch operation sub-period (e.g., the touch operation sub-period FP3TP1) starts, and other pixel data (e.g., pixel data corresponding to the gate lines from the 21th row to the 27th row) may still be continuously written (or temporarily stored) in the line memory 111b corresponding/according to the external horizontal synchronization signal Hsync1 in the touch operation sub-period (FP3TP1). Besides, the pixel data newly written into the line memory 111b (e.g., the pixel data corresponding to the gate lines from the 21th row to the 27th row) may be read out from the line memory 111b corresponding/according to the internal horizontal synchronization signal Hsync2 in the next display operation sub-period (e.g., the display operation sub-period FP3DP2). Other pixel data (e.g., pixel data corresponding to the gate lines from the 28th row to 40th row) may be written into the line memory 111b corresponding/according to the external horizontal synchronization signal Hsync1 in the display operation sub-period FP3DP2 and outputted to the touch display panel 120 corresponding/according to the internal horizontal synchronization signal Hsync2.

In the long H mode, because certain pixel data (e.g., pixel data corresponding to the gate lines from the first row to the 7th row) must be written (or temporarily stored) in the line memory 111b before the corresponding display operation sub-period (e.g., the display operation sub-period FP3DP1), there may be a delay DL3 between (the frame F3 of) the external horizontal synchronization signal Hsync1 and (the frame period FP3 of) the internal horizontal synchronization signal Hsync2 as shown in FIG. 2. The delay DL3 may be greater/longer than or equal to the time to write the pixel data, which is required to be written into the line memory 111b in advance, so as to avoid any pixel data, which has not been written/temporarily-stored in the line memory 111b, to be read/requested during one display operation sub-period (e.g., the display operation sub-period FP3DP1). For example, if one touch operation sub-period (e.g., the touch operation sub-period FP3TP1) corresponds to 50 lines (or line count(s)) (meaning that pixel data corresponding to 50 gate lines is written into the line memory 111b in the touch operation sub-period) and the line memory 111b is able to store pixel data corresponding to 100 rows of gate lines, the number of lines corresponding to the delay DL3 (or line count(s)) may be greater than 50 and less than 100.

In one embodiment, as shown in FIG. 2, there may be a delay DL2 between (the frame F2 of) the external horizontal synchronization signal Hsync1 and (the frame period FP2 of) the internal horizontal synchronization signal Hsync2 in the long V mode. In one embodiment, in order to dynamically switch between the long H mode and the long V mode, as shown in FIG. 2, there may be a delay DL4 between (the frame F4 of) the external horizontal synchronization signal Hsync1 and (of a frame period FP4) the internal horizontal synchronization signal Hsync2 in the long V mode.

In one embodiment, the delays DL2, DL3, and/or DL4 between the external horizontal synchronization signal Hsync1 and the internal horizontal synchronization signal Hsync2 may correspond to the same number of lines (or the same number of pulses or the same line count). For example, each of the delays DL2, DL3, and DL4 may correspond to 50 lines. In one embodiment, the delay DL2 is proportional to the horizontal period tL2; the delay DL3 is proportional to the horizontal period tL3. The ratio of the delay DL2 to the delay DL3 is equal to the ratio of the horizontal period tL2 to the horizontal period tL3. In one embodiment, since the horizontal period tL2 is smaller/shorter than the horizontal period tL3, the time length of the delay DL3 may be greater/longer than the time length of the delay DL2. In another embodiment, the number(s) of lines corresponding to the delays DL2 and/or DL4 may be greater than the number of lines corresponding to the delay DL3.

The Detection of Touch Events or Touch Coordinates

In the long V mode, as shown in FIG. 3, the timing generation circuit 111c may control the touch circuit 114 to drive (all) the touch electrodes 122 of the touch display panel 120 (in a time-division manner) in a VFP time tVFP2' corresponding to the touch operation period FP2TP so as to sense/detect touch event(s) and/or touch coordinate(s) on the touch display panel 120.

Figure 5:
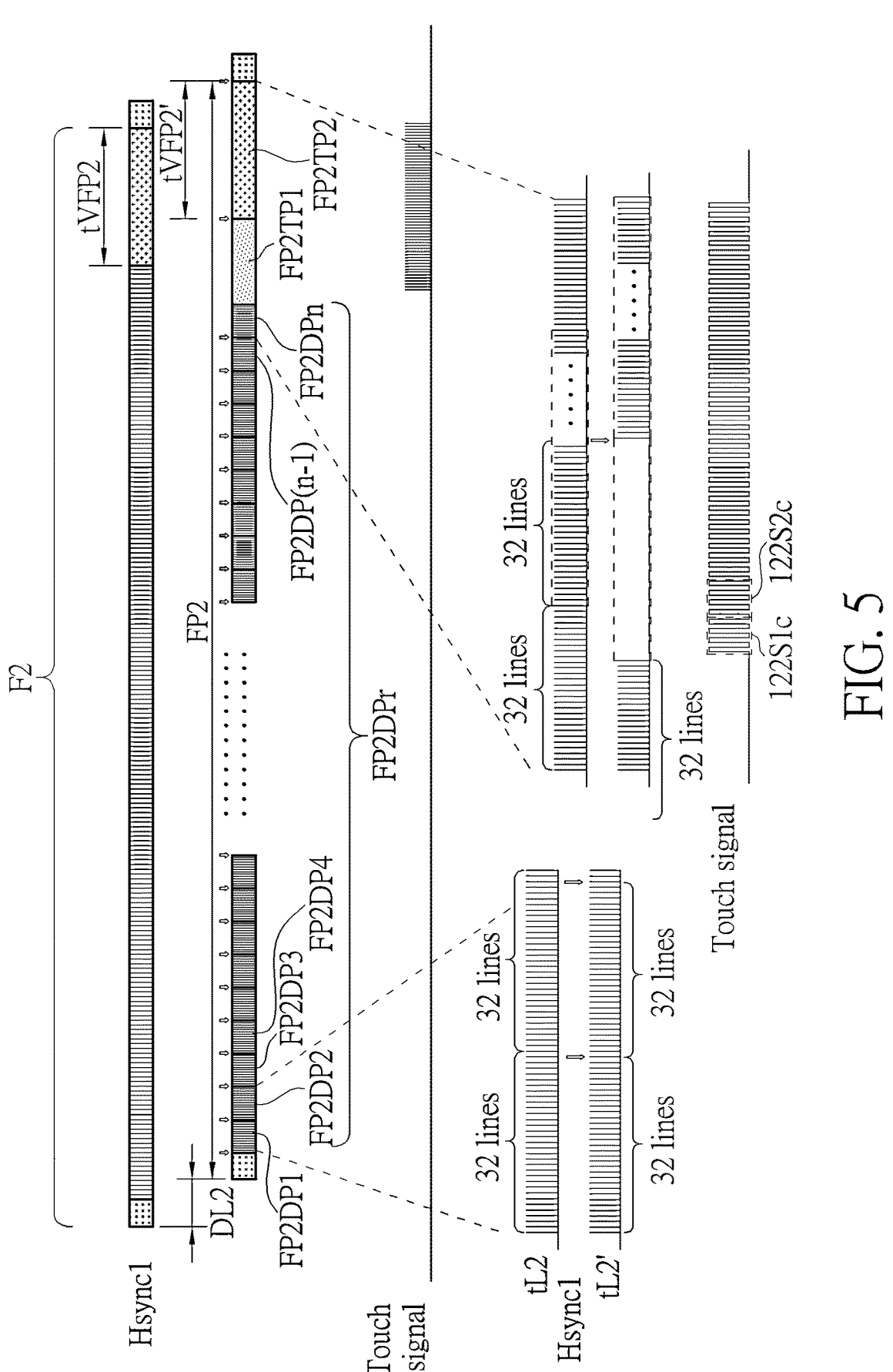
FIG. 5 to FIG. 7 are schematic timing diagrams according to embodiments of the present invention.

In another embodiment, in order to further squeeze out the time for touch operation in the long V mode, the time for display operation may be compressed/shortened. Please refer to FIG. 5, which is a schematic timing diagram according to an embodiment of the present invention. As shown in FIG. 5, touch operation may be performed during the touch operation sub-periods FP2TP1 and FP2TP2. The touch operation sub-period FP2TP2 corresponds to the VFP time tVFP2', which is equivalent/equal to the touch operation period FP2TP shown in FIG. 3.

Specifically, in the long V mode, the frequency of the internal horizontal synchronization signal Hsync2 may be higher than that of the external horizontal synchronization signal Hsync1. The receiving circuit 111a may write pixel data (e.g., the original data signal) into the line memory 111b according to the external horizontal synchronization signal Hsync1. Besides, the pixel data may be read out from the line memory 111b at a faster data rate according to the internal horizontal synchronization signal Hsync2 in the frame period FP2.

For example, in the long V mode, the time length of one/each display operation sub-period (e.g., a display operation sub-period FP2DP1) is equivalent/equal to (the time length of) 32 horizontal periods tL2' of the internal horizontal synchronization signal Hsync2, which correspond to 32 pulses/lines, or (the time length of) 31 horizontal periods tL2 of the external horizontal synchronization signal Hsync1, which correspond to 31 pulses/lines. In one/each display operation sub-period (e.g., the display operation sub-period FP2DP1), the receiving circuit 111a may write pixel data corresponding to 31 gate lines into the line memory 111b according to the external horizontal synchronization signal Hsync1. Besides, pixel data corresponding to 32 gate lines may be read out from the line memory 111b at a faster data rate according to the internal horizontal synchronization signal Hsync2 in the frame period FP2.

In the long V mode, if (the time length of) 32 horizontal periods tL2' of the internal horizontal synchronization signal Hsync2, which correspond to one display operation sub-period, is/are equivalent/equal to (the time length of) 31 horizontal periods tL2 of the external horizontal synchronization signal Hsync1, and a display operation period FP2DPr is divided into n display operation sub-periods FP2DP1-FP2DPn, the display operation period FP2DPr lacks n horizontal periods tL2 of the external horizontal synchronization signal Hsync1 (which may be served as the touch operation sub-period FP2TP1) compared with the display operation period FP2DP shown in FIG. 3. That is, n horizontal periods tL2 of the external horizontal synchronization signal Hsync1 for the display operation period FP2DP are used as the touch operation sub-period FP2TP1. Here, n is an integer such as 45.

That is, as shown in FIG. 5, touch operation may be performed in the touch operation sub-period FP2TP1 and the touch operation sub-period FP2TP2 corresponding to the VFP time tVFP2' in the long V mode. During the touch operation sub-periods FP2TP1 and FP2TP2, the timing generation circuit 111c may control the touch circuit 114 to drive (all) the touch electrodes 122 of the touch display panel 120 (in a time-division manner) so as to sense/detect touch event(s) and/or touch coordinate(s) on the touch display panel 120. For example, a touch signal 122S1c in FIG. 5 may be used to drive the touch electrodes 122 in the first column/row; a touch signal 122S2c in FIG. 5 may be used to drive the touch electrodes 122 in the second column/row. If touch operation is performed during the touch operation sub-period FP2TP1, it may be able to shorten the time length of the VFP time tVFP2' (or the number of lines or line counts of the VFP time tVFP2'), reduce bit rate and/or the required bandwidth, thereby saving power consumption.

In the long V mode, if (the time length of) 32 horizontal periods tL2' of the internal horizontal synchronization signal Hsync2, which correspond to one display operation sub-period, is/are equivalent/equal to (the time length of) 31 horizontal periods tL2 of the external horizontal synchronization signal Hsync1, the line memory 111b may need to temporarily store pixel data corresponding to one gate line (or pixel data corresponding to one line (count)) for/corresponding to one display operation sub-period (e.g., the display operation sub-period FP2DP1). If the display operation period FP2DPr is divided into 45 display operation sub-periods (e.g., the display operation sub-periods FP2DP1-FP2DPn), the line memory 111b may need to temporarily store pixel data corresponding to 45 gate lines. If the line memory 111b is able to store pixel data corresponding to 100 rows of gate lines, the number of lines (or line count(s)) corresponding to the delay DL2 may be greater than or equal to 45 and less than 100.

In another embodiment, in the long V mode, touch operation may be performed only during the touch operation sub-period FP2TP1 shown in FIG. 5 but not during the touch operation sub-period FP2TP2 corresponding to the VFP time tVFP2'. During the touch operation sub-period FP2TP1, the timing generation circuit 111c may control the touch circuit 114 to (simultaneously) drive touch electrodes 122, which are partially or entirely short-circuited to each other, so as to sense/detect touch event(s).

In one embodiment, the touch operation period FP2TP in FIG. 3 corresponds to the VFP time tVFP2'; the touch operation sub-period FP2TP2 in FIG. 5 corresponds to the VFP time tVFP2'. The present invention is not limited thereto: The control operation period or the touch operation sub-period may also correspond to a VBP time.

Synchronization

In one embodiment, in order to synchronize the timing of the internal horizontal synchronization signal Hsync2 with the timing of the external horizontal synchronization signal Hsync1 and the timing of the external vertical synchronization signal Vsync1, the timing generation circuit 111c may perform synchronization operation periodically/regularly.

For example, as shown in FIG. 4, in the long H mode, the external horizontal synchronization signal Hsync1 and the internal horizontal synchronization signal Hsync2 may be synchronized at the starting time (marked by a white arrow) of one/each time unit. For example, synchronization may be performed every 20 horizontal periods tL3 of the external horizontal synchronization signal Hsync1.

For example, as shown in FIG. 5, in the long V mode, the external horizontal synchronization signal Hsync1 and the internal horizontal synchronization signal Hsync2 may be synchronized at the starting time (marked by a white arrow) of each/one display operation sub-period (e.g., the display operation sub-period FP2DP1). For example, synchronization may be performed every 31 horizontal periods tL2 of the external horizontal synchronization signal Hsync1.

In one embodiment, a VBP time tVBP2, tVBP3, a VFP time tVFP2, or tVFP3 of the frames F2, F3 of the external horizontal synchronization signal Hsync1 may be equal to a VBP time tVBP2', tVBP3', a VFP time tVFP2', or tVFP3' of the frame period FP2 respectively.

In one embodiment, the delay DL2, the VFP time tVFP2, or the VBP time tVBP2 corresponding to the frame F2 may be equal to or unequal to the delay DL3, the VFP time tVFP3, or the VBP time tVBP3 corresponding to the frame F3. Since touch operation may be performed in the VFP time tVFP2, increasing the VFP time tVFP2 may increase the time length to perform touch operation. In one embodiment, the VFP time tVFP2 of the frame F2 may be greater/longer than the VFP time tVFP3 of the frame F3.

In one embodiment, each/one display operation sub-period (e.g., one of the display operation sub-periods FP3DP1-FP3DP10 shown in FIG. 4 and the display operation sub-periods FP2DP1-FP2DPn shown in FIG. 5) may be used to output pixel data corresponding to the same number of gate lines, so the time lengths of display operation sub-periods may be equal. Similarly, touch operation sub-periods (e.g., the touch operation sub-periods FP3TP1-FP3TP10 shown in FIG. 4) may be used to drive the same number of touch electrodes 122, so the time lengths of touch operation sub-periods may be equal. The number (e.g., 10) of touch operation sub-periods (e.g., the touch operation sub-periods FP3TP1-FP3TP10 shown in FIG. 4) may be related to the (total) number of columns (or rows) of all the touch electrodes 122.

The Same Frame Rate

Figure 6:
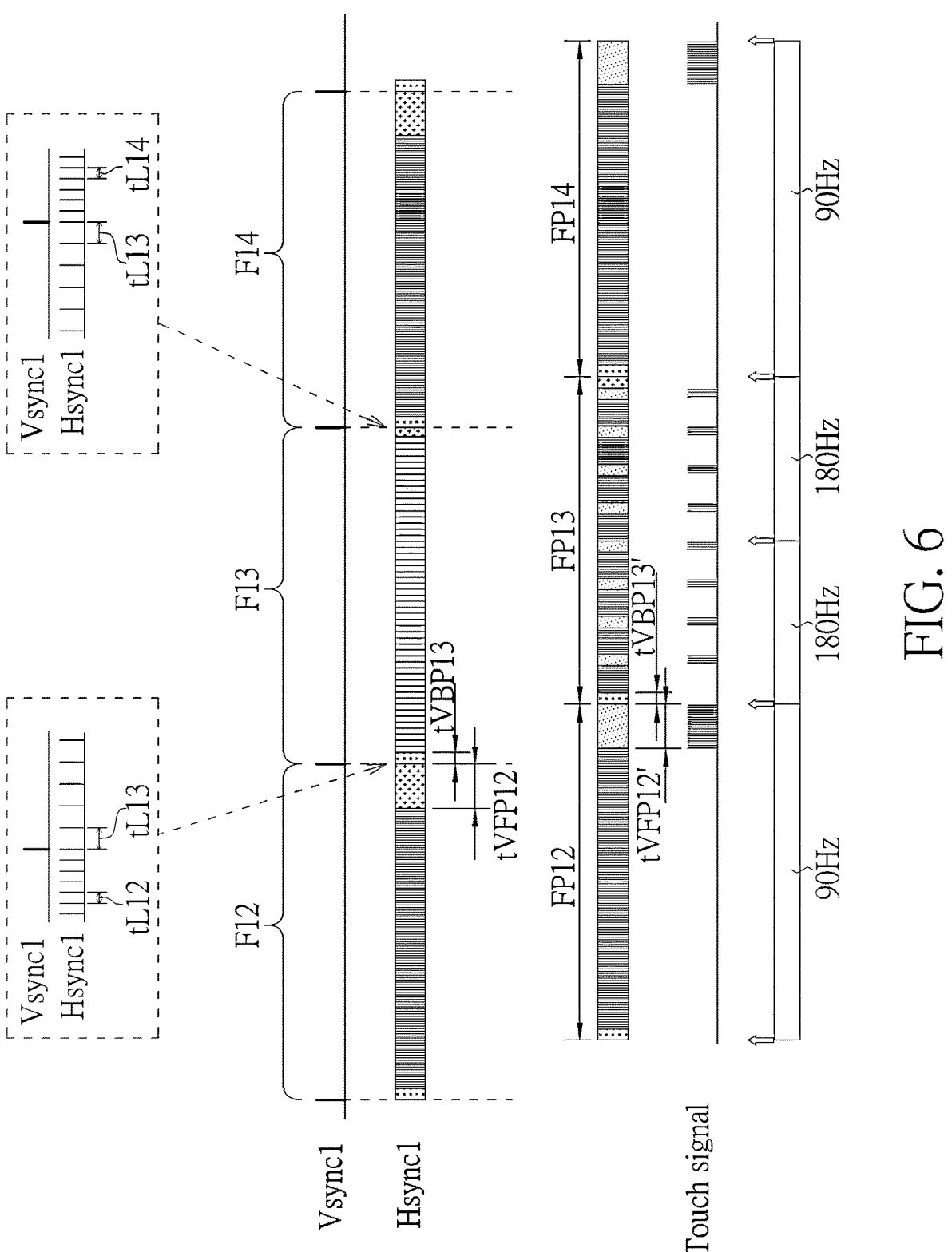

In one embodiment, frames at the same frame rate may adopt the long H mode and the long V mode respectively. Please refer to FIG. 1 and FIG. 6. FIG. 6 is a schematic timing diagram according to an embodiment of the present invention.

In one embodiment, the timing generation circuit 111c may be configured to determine whether the time lengths of horizontal periods (e.g., horizontal periods tL12-tL14 shown in FIG. 6) of two consecutive/adjacent frame (e.g., frames F12-F14 shown in FIG. 6) of the external horizontal synchronization signal Hsync1 are the same. Because the horizontal period tL13 is longer (than the horizontal period tL12), data signal outputted in the frame period FP12 may correspond to the long V mode and data signal outputted in the frame period FP13 may correspond to the long H mode.

In one embodiment, a frame period FP12 is equal to a frame period FP13, but the touch report rate corresponding to the frame period FP12 may be unequal to the touch report rate corresponding to the frame period FP13. For example, both the frame period FP12 and the frame period FP13 may be 11.11 milliseconds, such that both the frame rates are 90 Hz. However, the touch point rates may be, for example, 90 Hz and 180 Hz, respectively.

In another embodiment, a microcontroller unit (MCU) (not shown) of the driving circuit 110 may use an algorithm to interpolate/construct (new) points, such that the touch report rate in the long V mode may be different from the corresponding frame rate. For example, the frame period FP12 may be, for example, 11.11 milliseconds, which makes the frame rate 90 Hz, while the touch point rate may be, for example, 180 Hz. When it is switched from the long V mode to the long H mode, the frame rate may be maintained at 90 Hz, and the touch report rate may be maintained at 180 Hz.

Dynamical Switching Between the Long V Mode and the Long H Mode

As shown in FIG. 2 or FIG. 6, the present invention is able to dynamically switch between the long V mode and the long H mode. That is, in the process of switching from the long V mode to the long H mode, there is no need to switch to a sleep mode from the long V mode first (namely, performing an IC suspending mode or a power-off mode), and then switch from the sleep mode to the long H mode (namely, performing an IC resuming mode or a power-on mode). In other words, the switching takes place seamlessly during a display operation period without an interruption (e.g., entering a suspending/resuming mode or inserting any black frame). Therefore, in the process of switching from the long V mode to the long H mode, the touch display panel 120 would continue displaying images instead of being dimmed. That is, a frame in the long V mode (e.g., corresponding to the frame period FP12) and a frame in the long H mode (e.g., corresponding to the frame period FP13) may be two continuous/adjacent frames; (the end time of) a frame in the long V mode (e.g., corresponding to the frame period FP12) is connected/coincided to/with or goes directly before (without others coming in between) (the starting time of) a frame in the long H mode (e.g., corresponding to the frame period FP13). For example, (a VFP time tVFP12' of) a frame in the long V mode (e.g., corresponding to the frame period FP12) is connected to (a VBP time tVBP13' of) a frame in the long H mode (e.g., corresponding to the frame period FP13).

In short, in one embodiment, the timing generation circuit 111c may be leveraged to detect/measure/determine whether the time lengths of horizontal periods (e.g., the horizontal periods tL12, tL13) in two consecutive/continuous frames of the external horizontal synchronization signal Hsync1 is the same so as to determine whether to switch to the long V mode or the long H mode.

In another embodiment, the timing generation circuit 111c may determine, according to the received external horizontal synchronization signal Hsync1, whether to switch to the long V mode or the long V mode by detecting/measuring the time length(s) of horizontal period(s) (e.g., the horizontal period tL12). For example, based on the time length of the horizontal period tL12, data signal outputted during the frame period FP12 may correspond to the long V mode. Based on the time length of the horizontal period tL13, data signal outputted during the frame period FP13 may correspond to the long H mode.

In another embodiment, the timing generation circuit 111c may determine whether to switch to the long V mode or the long H mode according to command(s) it receives. For example, based on command(s) received by the timing generation circuit 111c, data signal outputted during the frame period FP12 may correspond to the long V mode, and data signal outputted during the frame period FP13 may correspond to the long H mode.

Figure 7:
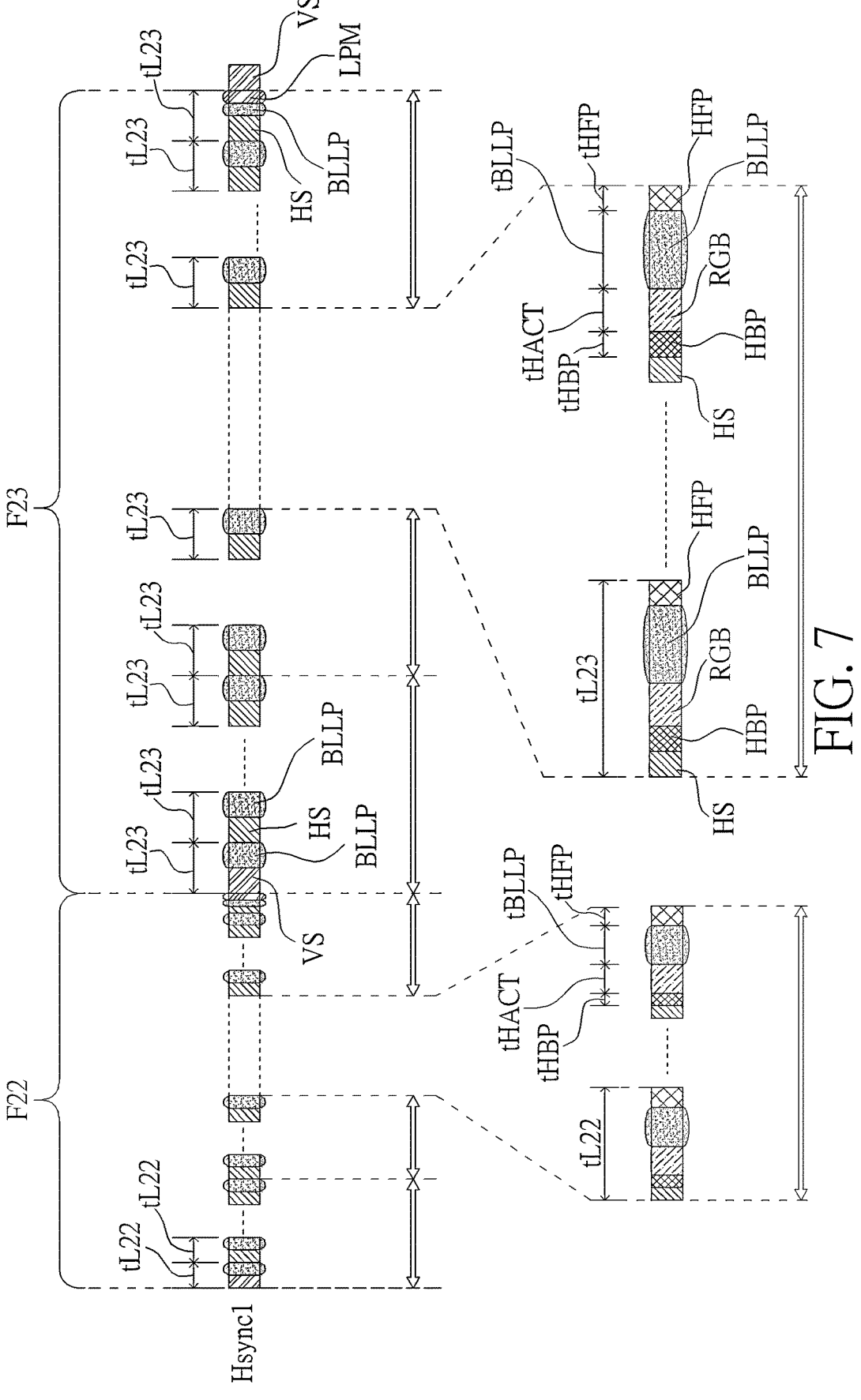

FIG. 7 is a schematic timing diagram of an embodiment of the present invention. In another embodiment, the timing generation circuit 111c may determine, according to the received external horizontal synchronization signal Hsync1, whether to switch to the long V mode or the long H mode by detecting/measuring the time length tBLLP, tHACT, tHBP, or tHFP of a blanking-or-low-power interval BLLP (which is configured to introduce a low power state), a horizontal active line (HACT) RGB, a horizontal back porch HBP, or a horizontal front porch HFP of a horizontal period (e.g., the horizontal period tL22/tL23). Both the frames F22 and F23 may include a vertical synchronization end packet VS, a horizontal synchronization start packet HS, a low power mode LPM, a blanking-or-low-power interval BLLP, a horizontal active line RGB, a horizontal back porch HBP, or a horizontal front porch HFP.

In one embodiment, the time length of the horizontal period tL22/tL23, a blanking-or-low-power period BLLP, a horizontal active line RGB, a horizontal back porch HBP, or a horizontal front porch HFP is substantially determined by the front stage circuit (not shown in FIG. 1) and may be known/found from the video packet stream 100 transmitted by the front stage circuit. That is, the front stage circuit may determine whether/how the frame rate is changed. The timing generation circuit 111c passively performs internal switching (which corresponds to the timing switching of the long V mode or the long H mode) according to the video packet stream 100 from the front stage circuit.

In one embodiment, the touch display panel 120 may include a display panel for display operation and a touch panel for touch operation. The touch panel may be embedded inside the display panel.

In one embodiment, the driving circuit 110 may include a touch-and-display-driver integrated circuit and/or other driving circuit(s). The transmission interface may include a mobile industry processor interface (MIPI) and/or other transmission interface(s).

Please note that the figures are only for illustration and may not be to scale. The scale may be further modified according to different design considerations. The terms "include" and "comprise" are used in an open-ended fashion, and thus should be interpreted to mean "include, but not limited to". Use of ordinal terms such as "first" and "second" does not by itself connote any priority, precedence, or order of one element over another, the chronological sequence in which acts of a method are performed, or the necessity for all the elements to be exist at the same time, but are used merely as labels to distinguish one element having a certain name from another element having the same name. The terms "when" may be interpreted to mean "if", "under the condition of", "immediately at the time of", "immediately after", or "after a (acceptable/ignorable) length of time of". Different technical features described in the embodiments may be mixed or combined in various ways if they are not conflict to each other.

In summary, a driving circuit of the present invention may automatically switch between the long H mode and the long V mode according to period(s) which a video packet stream corresponds (e.g., according to whether the time lengths of horizontal periods of two consecutive frame are equal) to improve display quality. The present invention may adopt the long V mode at an HFR, and adopt the long H mode at an LFR for power saving. Using the long V mode at an HFR may avoid irrecoverable display horizontal stripes on a touch display panel when a horizontal period is short. Using the long H mode and the extended H mode at an LFR may prevent a vertical blank period being too long, and thus screen flickering issues or other abnormal display issues may be resolved. It is easier for voltage(s) to reach predetermined/desired level(s) by using the long H mode and the extended H mode at an LFR since horizontal periods would be relatively longer. In the present invention, the touch report rate corresponding to an HFR may be equal to the touch report rate corresponding to an LFR.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A timing control circuit, comprising:
a receiving circuit; and
a line memory, coupled to the receiving circuit, wherein the line memory is configured for:
receiving a signal;
outputting a first data signal corresponding to a first frame of the signal to drive at least one data line; and
outputting a second data signal corresponding to a second frame of the signal to drive the at least one data line;
wherein after a first frame rate of the first frame is determined to be higher than a second frame rate of the second frame, a switch from a long V mode to a long H mode takes place, such that the first data signal corresponds to the long V mode and the second data signal corresponds to the long H mode;
wherein after the first frame rate is determined to be lower than the second frame rate, a switch from the long H mode to the long V mode takes place, such that the first data signal corresponds to the long H mode and the second data signal corresponds to the long V mode.

2. The timing control circuit of claim 1,
wherein a first touch signal corresponding to the first frame is after the first data signal corresponding to the long V mode;
wherein the second data signal corresponding to the long H mode and a second touch signal corresponding to the second frame are time-interleaved.

3. The timing control circuit of claim 1,
wherein the first data signal corresponding to the long H mode is divided and allocated to non-contiguous time units;
wherein the first data signal corresponding to the long V mode is allocated to a single contiguous time unit.

4. The timing control circuit of claim 1,
wherein the first frame rate determined to be higher than the second frame rate is equal to a first touch report rate corresponding to the first frame;
wherein the first frame rate determined to be lower than the second frame rate is unequal to the first touch report rate.

5. The timing control circuit of claim 1,
wherein the first frame rate is unequal to the second frame rate;
wherein a first touch report rate corresponding to the first frame is equal to a second touch report rate corresponding to the second frame.

6. The timing control circuit of claim 1, wherein one of the first data signal and the second data signal corresponds to the long H mode and an extended H mode.

7. The timing control circuit of claim 1,
wherein a number of at least one first pulse within the first frame is equal to a number of at least one second pulse within the second frame;
wherein a first period of the at least one first pulse is unequal to a second period of the at least one second pulse.

8. The timing control circuit of claim 1,
wherein the signal comprises at least one first pulse, which is within the first frame, and at least one second pulse, which is within the second frame;

wherein both a first period for the at least one first pulse and a second period for the at least one second pulse are a horizontal period, a horizontal active line, a blanking-or-low-power period, a horizontal back porch, or a horizontal front porch.

9. The timing control circuit of claim 1, wherein when the first frame rate is determined to be equal to the second frame rate, a first touch report rate corresponding to the first frame is unequal to a second touch report rate corresponding to the second frame.

10. The timing control circuit of claim 1, wherein the first data signal corresponding to the long V mode corresponds to a longer vertical front porch time than the second data signal corresponding to the long H mode.

11. A timing control method, comprising:
receiving a signal;
outputting a first data signal corresponding to a first frame of the signal to drive at least one data line; and
outputting a second data signal corresponding to a second frame of the signal to drive the at least one data line;
wherein after a first frame rate of the first frame is determined to be higher than a second frame rate of the second frame, a switch from a long V mode to a long H mode takes place, such that the first data signal corresponds to the long V mode and the second data signal corresponds to the long H mode; and
wherein after the first frame rate is determined to be lower than the second frame rate, a switch from the long H mode to the long V mode takes place, such that the first data signal corresponds to the long H mode and the second data signal corresponds to the long V mode.

12. The timing control method according to claim 11, wherein a first touch signal corresponding to the first frame is after the first data signal corresponding to the long V mode;
wherein the second data signal corresponding to the long H mode and a second touch signal corresponding to the second frame are time-interleaved.

13. The timing control method according to claim 11, wherein the first data signal corresponding to the long H mode is divided and allocated to non-contiguous time units;
wherein the first data signal corresponding to the long V mode is allocated to a single contiguous time unit.

14. The timing control method according to claim 11, wherein the first frame rate determined to be higher than the second frame rate is equal to a first touch report rate corresponding to the first frame;
wherein the first frame rate determined to be lower than the second frame rate is unequal to the first touch report rate.

15. The timing control method according to claim 11, wherein the first frame rate is unequal to the second frame rate;
wherein a first touch report rate corresponding to the first frame is equal to a second touch report rate corresponding to the second frame.

16. The timing control method according to claim 11, wherein one of the first data signal and the second data signal corresponds to the long H mode and an extended H mode.

17. The timing control method according to claim 11, wherein a number of at least one first pulse within the first frame is equal to a number of at least one second pulse within the second frame;
wherein a first period of the at least one first pulse is unequal to a second period of the at least one second pulse.

18. The timing control method according to claim 11, wherein the signal comprises at least one first pulse, which is within the first frame, and at least one second pulse, which is within the second frame;
wherein both a first period for the at least one first pulse and a second period for the at least one second pulse are a horizontal period, a horizontal active line, a blanking-or-low-power period, a horizontal back porch, or a horizontal front porch.

19. The timing control method according to claim 11, wherein when the first frame rate is determined to be equal to the second frame rate, a first touch report rate corresponding to the first frame is unequal to a second touch report rate corresponding to the second frame.

20. The timing control method according to claim 11, wherein the first data signal corresponding to the long V mode corresponds to a longer vertical front porch time than the second data signal corresponding to the long H mode.

* * * * *